United States Patent [19]
Dietrich

[11] Patent Number: 5,364,509
[45] Date of Patent: Nov. 15, 1994

[54] WASTEWATER TREATMENT

[75] Inventor: Jospeh J. Dietrich, Painesville, Ohio

[73] Assignee: Eltech Systems Corporation, Chardon, Ohio

[21] Appl. No.: 7,296

[22] Filed: Jan. 21, 1993

[51] Int. Cl.$^5$ .............................................. C02F 1/461
[52] U.S. Cl. ................................ 204/149; 204/290 F; 204/131
[58] Field of Search ............... 204/149, 290 F, 290 R, 204/291, 275, 268, 269, 131

[56] References Cited

U.S. PATENT DOCUMENTS

| | | | |
|---|---|---|---|
| 3,627,669 | 12/1971 | Entwisle | 204/290 F |
| 3,873,438 | 3/1975 | Anderson et al. | 204/268 |
| 3,926,771 | 12/1975 | Lieb et al. | 204/268 |
| 4,118,307 | 10/1978 | LaBarre | 204/268 |
| 4,179,347 | 12/1979 | Krause et al. | 204/149 |
| 4,292,175 | 9/1981 | Krause et al. | 204/149 |
| 4,626,334 | 12/1986 | Ohe et al. | 204/290 R |
| 4,783,246 | 11/1988 | Langeland et al. | 204/95 |
| 4,797,182 | 1/1989 | Beer et al. | 204/14.1 |
| 4,839,007 | 6/1989 | Kötz et al. | 204/149 |

FOREIGN PATENT DOCUMENTS 0280926 2/1988 European Pat. Off. .

OTHER PUBLICATIONS

Stucki et al., Electrochemical wastewater treatment using highover voltage anode, Part II: Anode performance and applications, Journal of Applied Electrochemistry, vol. 21 (1991), pp. 99-104.

The publication "Electrochemical Wastewater Treatment Using High Overvoltage Anodes", (1990), Kotz et al., pp. 14-20, Chapman and Hall Ltd.

The publication "Electrochemical Treatment of Wastewater Containing Organic Pollutants", Proc. Electrochem. Society, vol. 90-10, (1990) pp. 71-87, by Comninellis.

Primary Examiner—John Niebling
Assistant Examiner—Arun S. Phasge
Attorney, Agent, or Firm—John J. Freer

[57] ABSTRACT

Wastewater, particularly black and gray water, produced in macerating human waste, is now treated to provide reduced total suspended solids. The wastewater includes a liquid media comprising salt-containing substance such as brine or seawater. The wastewater is electrolytically treated. In the treatment the electrolysis cell contains an anode that has a surface coating including tin dioxide. During electrolysis, the cell will produce hypochlorite while also reducing BOD and residual chlorine discharge.

9 Claims, 1 Drawing Sheet

WASTEWATER TREATMENT

TECHNICAL FIELD

The present invention relates to on-site package treatment systems for the treatment of wastewater. More specifically, the present invention relates to the on-site treatment of a domestic waste, which contains suspended organic solids, at the point of generation of the waste.

BACKGROUND OF THE INVENTION

The on-site treatment of a domestic-type waste is used at those locations where there is no access to a municipal water treatment plant or equivalent facility. Examples of such locations are ships and off-shore drilling platforms.

At such locations, the waste typically flows through a biological or fermentation unit on board, and then into a holding tank. When the effluent in the holding tank reaches a certain level, it is pumped through a sterilizing unit where the effluent is sterilized, usually with sodium or calcium hypochlorite. The effluent is then pumped overboard. Such treatment is costly and requires the use of large and heavy, space consuming equipment.

DESCRIPTION OF THE PRIOR ART

U.S. Pat. No. 4,783,246 to Langeland et al. discloses a small hypochlorite electrolyzer for the on-site treatment of sewage. The electrolyzer is useful at such locations as ships and off-shore drilling platforms. The electrolyzer is operational with seawater for generating sodium hypochlorite. The electrolyzer comprises a two-piece casing which can be opened for easy access for inspection and cleaning. Plate-like bipolar electrodes are recessed in the casing. Seawater is mixed with the sewage, and the mixture is pumped into the electrolyzer. Sodium hypochlorite is generated from the seawater which reduces the biological oxygen demand (BOD) of the sewage, and purifies the sewage. The sewage is then allowed to flow overboard.

U.S. Pat. No. 3,873,438, to Anderson et al., also discloses an electrolytic cell for the production of sodium hypochlorite from brine. The sodium hypochlorite is used to treat water in water storage or supply systems. The sodium hypochlorite prevents the proliferation of algae, slime, and bacteria. The electrolytic cell can be employed at the point of water use, and eliminates the need for the storage of sodium hypochlorite at such point of use.

U.S. Pat. No. 4,626,334, to Ohe et al., discloses an electrode for use in the electrolysis of aqueous alkali metal salt solutions. The electrode has a solid solution coating of the $(Ru-Sn)O_2$ type, more specifically 3–45 mole percent ruthenium oxide, 0.1–30 mole percent metallic platinum or platinum oxide, and/or iridium oxide, and 50–96.9 mole percent tin oxide. In the electrolysis of brine, using an ion exchange membrane cell, the electrode provides increased oxygen overvoltage, reduced oxygen evolution and reduced chlorine overvoltage. There is no reference in the patent to the treatment of sewage.

U.S. Pat. No. 4,839,007, to Kotz et al., discloses a method for treating industrial chemical waste. An electrochemical cell is provided. The cell has an anode which comprises tin dioxide doped with an element such as fluorine, chlorine, antimony, molybdenum, tungsten, niobium, and tantalum. The object in the patent is to provide a method for the direct oxidation of organic pollutants in the industrial waste, such as benzoic acid, orange dye and naphthalenesulfonic acid, by means of electrochemical oxidation in the cell. There is no suggestion in the patent of applicability of this method to the treatment of a domestic waste containing suspended organic solids. Moreover, the patent calls for the removal of noble metals in any form from the anode coating.

An article in the publication, Journal of Applied Electrochemistry, Volume 21 (1991), pages 99–104, by Stuki et al., also discloses the treatment of industrial waste, particularly organic compounds such as benzoic acid and phenol, using an electrochemical cell. The cell has a high overvoltage tin dioxide anode doped with antimony. As with U.S. Pat. No. 4,839,007, there is no suggestion in this publication of applicability of the method or apparatus to the treatment of domestic waste.

The publication "Electrochemical Wastewater Treatment Using High Overvoltage Anodes", (1990), Kotz et al., pages 14–20, Chapman and Hall Ltd., contains a disclosure similar to the Stuki et al. publication. A tin dioxide anode was used in the treatment of biorefractory organics, especially phenol. These are organic pollutants which are not decomposed by microorganisms under normal conditions. There is no suggestion in the publication which would lead to the treatment of a waste containing suspended organic solids.

The publication "Electrochemical Treatment of Wastewater Containing Organic Pollutants", Proc. Electrochem. Society, Vol. 90-10, (1990) pages 71–87, by Comninellis, discloses the electrochemical treatment of industrial wastewater containing organic pollutants such as phenol. The publication discloses a method which allows the determination of the electrochemical oxidation of organic species using what is referred to as the "electrochemical oxidability index" (EOI) and the degree of oxidation using the "electrochemical oxygen demand" (EOD) test. The tin dioxide anode was found to give EOI values much higher than all other anodes, due to the high overvoltage for oxygen evolution of the tin anodes. In this publication, also, there is no suggestion which would lead to use of the anode in the treatment of a waste product containing suspended organic solids.

SUMMARY OF THE INVENTION

The present invention relates to the on-site treatment of wastewater containing suspended solids. The wastewater is passed, usually from a holding tank, to a macerating unit for reducing the particle sizes of the solids within the waste. The wastewater is then mixed with a salt-containing substance such as saltwater in the macerating unit forming a reaction mixture. The reaction mixture is introduced into an electrolyzer having a reaction chamber, and anode and cathode electrodes in said reaction chamber. The anode comprises a tin dioxide coating. A current is impressed on the reaction mixture. This generates oxygenated species and hypochlorite in the reaction mixture. The resulting treated reaction mixture is then passed to a holding tank. This sequence is sufficient to achieve, compared to the same treatment sequence using a control cell comprising an anode having an electrochemically active coating of tantalum oxide and iridium oxide, a reduction of BOD of at least 30% and a reduction in total suspended solids of at least 30%.

A preferred anode is one having a doped tin dioxide coating on an electrochemically active surface of a platinum group metal and/or metal oxide coating, which is in turn, on a valve metal anode substrate.

A preferred dopant is antimony oxide.

The present invention is of particular interest for an on-site plant for the treatment of domestic wastewater containing suspended solids comprising a macerator, means to introduce a salt-containing substance into said macerator to form a reaction mixture; an electrolyzer for receiving the salt-containing reaction mixture from said macerator; and a holding tank to receive treated reaction mixture from the electrolyzer. The electrolyzer comprises a housing having at least one bipolar or a pair of monopolar electrodes, and means for impressing an electrical current on the reaction mixture in said electrolyzer generating oxygenated species and hypochlorite from said salt-containing reaction mixture. The electrolyzer comprises anode means with a tin dioxide-containing coating. The apparatus is sufficient to achieve, compared to the same apparatus combination using a control cell comprising an anode having a coating of tantalum oxide and iridium oxide, a reduction in BOD of at least 30% and a reduction in total suspended solids content of at least 30%.

It is known that doped tin oxide anodes can be useful in electrolyzing salt solutions. When there is a noble-metal content in the coating, oxygen evolution can be expected to be suppressed in favor of chlorine evolution in chloride salt electrolysis. Thus, the generous production of oxygenated species and substantial reduction in BOD for electrolyzing a salt-containing reaction mixture in the present invention was not forecast. For comparison, see for example the teachings of using an anode with a noble metal coating for chlorine generation and wastewater disinfection as taught in U.S. Pat. No. 3,926,771. Moreover, the present invention can provide for a reduction in residual chlorine discharge, even for wastewater electrolysis in a sodium chloride electrolyte. Such reduction in chlorine can be on the order of at least 30%.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

The present invention resides broadly in the treatment of wastewater containing organic solids. The present invention is particularly applicable to the treatment of water containing domestic waste. The term "domestic waste" in contrast to industrial chemical waste, means the typical household-type waste which comprises human waste known as "black water" as well as kitchen waste known as "gray water".

The present invention is particularly applicable to the on-site treatment of wastewater where a salt-containing substance, e.g., brine or saltwater, is available. The term "on-site treatment" means treatment at the point of generation of the wastewater, in contrast to the treatment of such water at a site remote from the site of generation of the wastewater, for instance at a municipal water treatment plant. The term "salt-containing" substance usually refers to brine, either artificial or natural, or saltwater, i.e., a salt-containing electrolyte. However, where appropriate, such term is meant to include the salt itself, e.g., solid sodium chloride, such as in tabletted form, it being understood that the use of other salts, or mixtures of salts, is also contemplated. Most always, particularly in a marine application, any resulting salt-containing reaction mixture will have a pH within the range of 6–9, more usually 6–8.

Locations requiring "on-site treatment" of wastewater are those incapable of hook-up to large municipal water treatment plants. Examples of such locations are drilling platforms and ships.

A principal problem in the treatment of water containing a domestic waste is the reduction of BOD, COD and particulate matter suspended in the water. Even with the maceration of such particulates, followed by biological or fermentation-type degradation, and/or hypochlorite treatment, the reduction of such particulate matter to limits mandated by recent Federal Regulations has been marginal.

An object of the present invention is to provide improved on-site treatment of water containing domestic waste, including a reduction in BOD and COD and especially a reduction in total suspended solids in the waste to limits well below those mandated by recent Federal Regulations, as well as sterilization of the wastewater. The present invention can provide for hypochlorite generation during BOD, COD (chemical oxygen demand) and particulate solids reduction, which hypochlorite generation is achieved along with a commensurate reduction in residual chlorine discharged.

When compared with a control cell as described hereinabove, the reduction in BOD and total suspended solids, as well as the reduction in residual chlorine discharged, can be at least 30%. Advantageously, this reduction in all three characteristics will be on the order of 40% or more. Moreover, it has been found in actual test results that the reduction in BOD and total suspended solids can preferably be on the order of 50% or more.

Figure 1:
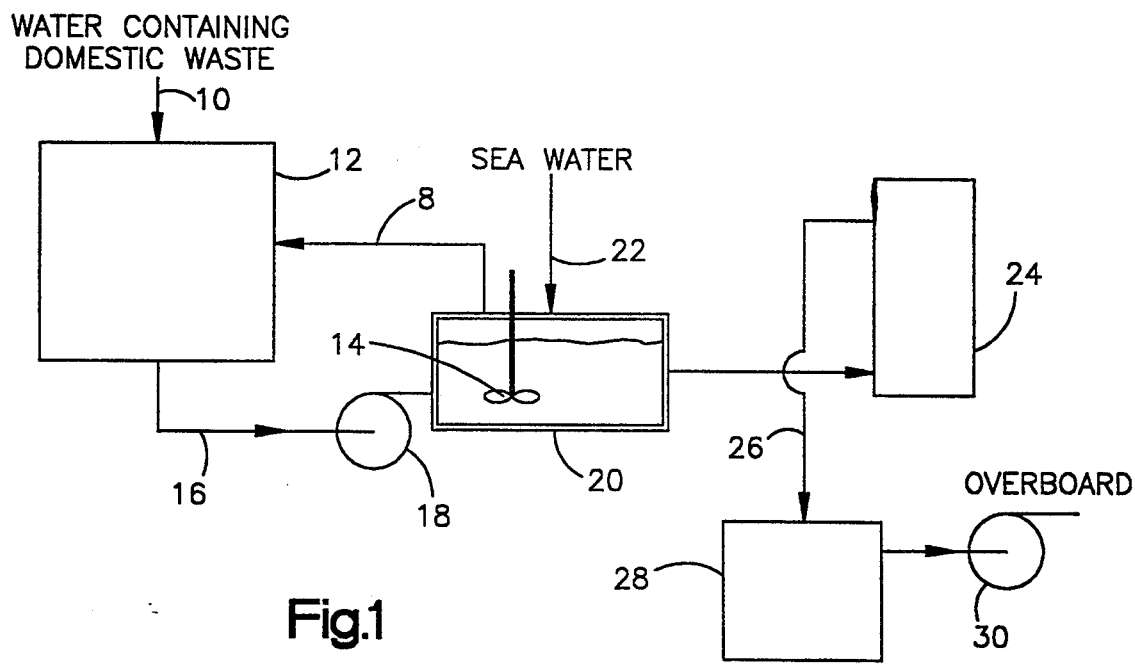
FIG. 1 is a flow diagram illustrating the method, and apparatus therefor, for the purification of wastewater in accordance with the present invention.

In one manner of practicing the present invention, and referring now to FIG. 1, water containing domestic waste is first passed in line 10 to a holding tank 12. The effluent from the holding tank 12 is pumped in line 16, by pump 18, to a macerating unit 20, containing impeller 14, wherein the particle sizing of particulate matter in the wastewater is reduced. In the macerating unit 20, a salt-containing substance, e.g., seawater, enters through line 22 and is mixed with the effluent from the holding tank 12 forming a reaction mixture. The combined reaction mixture of water and salt-containing electrolyte is then pumped to an electrolyzer 24 for the further treatment of the mixture. Also, a portion of the mixture can be recycled from the macerating unit 20 through line 8 to the holding tank 12. In practice, a substantial portion of the mixture can be recycled, compared to the amount passed to the electrolyzer 24. On a volume basis, the ratio of recycled mixture, to mixture passed to the electrolyzer can typically vary within the range of from about 3:1 to about 9:1. The effluent from the electrolyzer 24 then flows in line 26 to a holding tank 28, in which it may be held for about one-half hour, minimum, and from which it is pumped overboard by pump 30.

The amount of salt-containing substance added to the macerating unit 20, is sufficient to function as the electrolyte in the electrolyzer 24, for the flow of current in the electrolyzer. The amount of seawater typical for drilling platform operation may be in the range of 60 liters per hour up to 2,500 liters per hour, based on the variables of the system, such as size of the electrolyzer, number of people on the platform and so forth.

Suitable structures for the electrolyzer 24 are well known in the field of domestic waste treatment in marine environments and all such structures are contemplated for use in the present invention. One such electrolyzer 24 has a tubular configuration as has been shown in U.S. Pat. No. 3,873,438. The electrolyzer has a tubular anode, but other electrode geometries are contemplated, e.g., mesh or blade. A further suitable structure is shown in FIG. 2.

Figure 2:
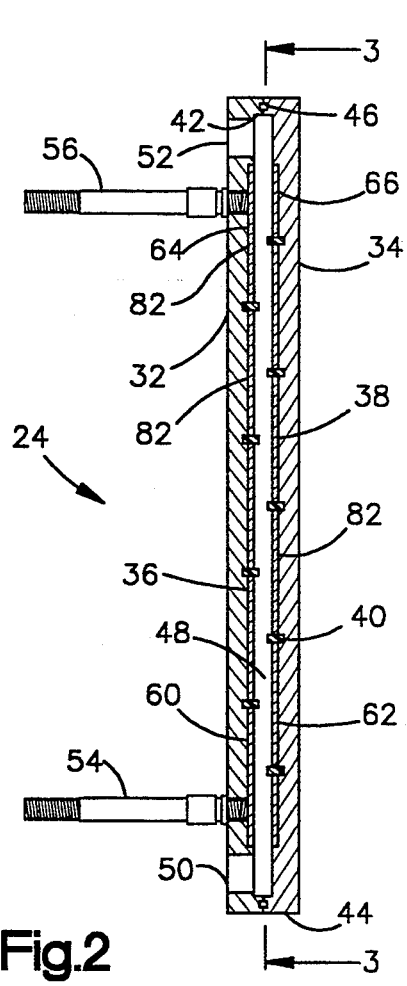
FIG. 2 is a section elevation view of an electrolyzer useful in the method, and apparatus, of FIG. 1.

Referring to FIG. 2, the electrolyzer 24 is formed of two elongated, electrically non-conductive, casing members 32, 34. These casing members 32, 34 have been brought together, into a closed position, to form the electrolyzer 24. The casing members 32, 34 are separable to permit opening the electrolyzer for cleaning and maintenance. Each casing member 32, 34, houses flat, plate-like electrode elements 36, 38, which are fastened to the casing members 32, 34, by means of non-conductive fastening elements 40. One casing member 32 has an outer rim 42. The casing member 34 has an outer rim 44. The rims 42 and 44 have facing shallow depressions which contain a gasket 46. The dimensions of the rims 42, 44 are those necessary so that the casing members 32, 34 define a fluid flow passageway 48 between the electrode elements 36 and 38. The gasket 46 seals the fluid flow passageway.

The casing member 32 has a lower fluid inlet 50 and an upper fluid outlet 52.

Figure 3:
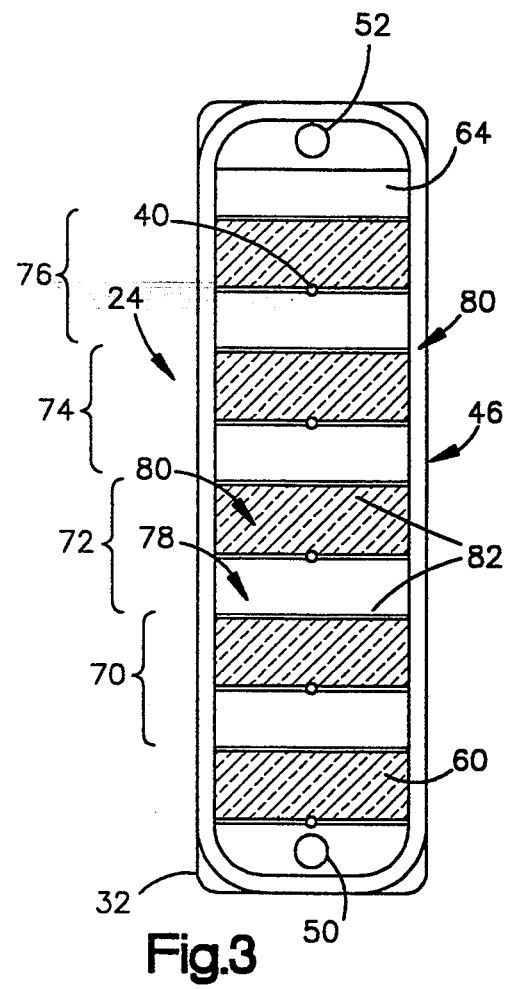
FIG. 3 is plan view taken along section line 3—3 of FIG. 2.

The casing member 32 also contains a lower anode terminal 54 and an upper cathode terminal 56. These terminals 54, 56 are mounted through the wall portion of the casing member 32. For the anode terminal 54, this mounting through the wall connects the terminal to a primary anode plate 60. The primary anode plate 60 is shown in FIG. 3. Across the fluid flow passageway 48 from the primary anode plate 60 is an electrode element 62 (FIG. 2) which is approximately twice the height of the primary anode plate 60. The opposite electrode element 62 is a bipolar electrode and is affixed to the casing member 34. Similarly, the upper cathode terminal 56 connects with a primary cathode plate 64, FIGS. 2 and 3. This primary cathode plate 64 likewise has, across the fluid flow passageway 48, an electrode element 66 of at least approximately twice the height of the primary cathode plate 64. This opposite, electrode element 66 thus is a bipolar electrode.

Other than the primary anode plate 60 and the primary cathode plate 64, all electrode elements depicted in FIGS. 2 and 3 are bipolar electrodes. Also, the facing bipolar electrodes of one casing member 32 are offset in regard to the bipolar electrodes of the opposing electrode members 34, as will be described.

More specifically, referring to FIG. 3, a set of four bipolar electrode elements 70, 72, 74, and 76 are positioned above the primary anode plate 60. Each bipolar electrode element has a cathode section, for instance cathode section 78 for electrode 72, and an anode section, for instance anode section 80, for electrode 72. In FIG. 3, for the purpose of illustration, the anode sections are shaded, and the cathode sections are clear. Above the uppermost bipolar electrode element 76, is the primary cathode plate 64. The electrode elements are separated from themselves and from the primary anode plate 60 and the primary cathode plate 64 by individual casing member ribs 82 (FIGS. 2 and 3). Also, the individual electrode elements and the primary plates 60, 64 have their broad back faces secured to the casing member 32 by means of the non-conductive fastening elements 40, mentioned above, that are centrally positioned with respect to each electrode element.

The electrode elements and primary plates will generally have square or rectangular broad faces, and a long axis that runs transverse to the longitudinal axis of the casing member 32. Around the outside of the casing member 32 is the peripheral groove for receiving gasket 46.

It will be understood by those skilled in the art that the casing 34 will be, to a degree, the mirror image of the casing 32, except that the electrode elements 38 will comprise five bipolar electrodes, instead of four, facing the electrode elements 36 of casing 32. As mentioned above, the bipolar electrodes 38 are offset with regard to the bipolar electrodes 36 of casing member 32. For instance, the uppermost electrode element 66 of casing member 34 is coextensive with the primary cathode plate 60 and the upper anode section of bipolar electrode 76 (FIG. 3) of casing member 32. The same relationship exists with respect to the remaining electrode elements.

In operation, the lower anode terminal 54 and upper cathode terminal 56 are connected externally to a current supply (not shown). A solution, typically of brine and water, containing domestic waste, is introduced into the electrolyzer 24 through the lower fluid inlet 50. The solution passes through the fluid flow passageway 48 between the electrode elements 36, 38. The solution, comprising spent brine, as well as electrolysis products, leaves the electrolyzer 24 through the upper fluid outlet 52. The brine in the solution functions as electrolyte for the electrolyzer. Owing to the offset nature of the electrode elements 36, 38, from one casing mender 32, 34, to the other, activated by conductance of the brine, a DC current flows in a staggered path through the brine from the primary cathode plate downward to the primary anode plate 60.

The casing members 32, 34 are preferably made of a machineable or moldable plastic that is resistant to brine and which is non-conductive, e.g., polyvinylchloride. Other suitable materials for the casing members are chlorinated polyvinylchloride, polypropylene, and acrylonitrile-butadiene-styrene. The gaskets 46 can be O-rings made from suitable elastomeric material such as ethylene-propylene diene monomer (EPDM) neoprene, vinyl and other like materials which are stable in brine.

The electrode elements within the casing members are flat, plate-like elements. Such plates are typically on the order of about 0.1 cm thickness, and usually, for economy, will not have a thickness exceeding about 0.65 cm. Advantageously, the spacing between electrode members 36, 38 does not exceed about 4 cm, to maximize electrode area while desirably suppressing current leakage. On the other hand, a spacing of at least about one centimeter is preferred for best current leakage suppression. It is understood that the spacing can be adjusted taking into consideration the degree of salinity of the brine being electrolyzed. Generally, the ratio of the spacing between electrodes to the distance across the fluid flow passageway is about 1:1 to about 8:1, preferably between about 1.5:1 to about 3:1.

The cathode can be any metal, e.g., iron or nickel, having good conductivity and durability, or may be other electroconductive material such as ceramic. Examples of suitable cathode metals are the valve metals such as titanium, tantalum, zirconium, and niobium, alloys of these metals with themselves and with other metals, as well as intermetallic mixtures.

The anode, as well as the anode sections of the bipolar electrodes, are coated electrodes. The substrate is an electroconductive anode substrate, generally one or more of the metals for the cathode, most typically a valve metal. For the above-discussed, exemplary bipolar electrode plate, the bipolar electrode is coated with an anodic coating approximately on one-half of its face, for instance as a stripe coating.

The anodic coating utilized in the present invention is often the combination of a sub-coating and a top coating, although it is contemplated that a sub-coating may not always be used. For example, U.S. Pat. No. 3,627,669 teaches the coating of tin dioxide and antimony oxide directly on a support such as titanium, with the article being useful as an electrode. When an subcoating is utilized, the sub-coating is often referred to herein simply for convenience as an electrochemically active coating, or referred to herein as an electroconductive coating. It can be provided from a platinum or other platinum group metal, which collectively may be referred to herein as the noble metals, or it may be any of a number of active oxide coatings such as platinum group metal oxides, magnetite, ferrite, cobalt spinel, or mixed metal oxide coatings which have been developed for use as anodic coatings in the industrial electrochemical industry. The platinum group metals include platinum, palladium, rhodium, iridium, and ruthenium or alloys thereof, with themselves and with other metals. Mixed metal oxides include at least one of the oxides of these platinum group metals, in combination with at least one oxide of a valve metal or other nonprecious metal.

Examples of platinum group metals or mixed metal oxides for anodic coatings are described in U.S. Pat. Nos. 3,265,526, 3,632,498, 3,711,385, and 4,528,084. The electrolyzer disclosed above is described in U.S. Pat. No. 4,783,246. The disclosures of all of these patents are incorporated by reference herein.

The top coating comprises tin dioxide ($SnO_2$). The tin dioxide is preferably doped with a dopant, which often is antimony oxide. Other dopants, including F, Cl, Sb, Mo, W, Nb, Ta or their mixtures, have been disclosed in U.S. Pat. No. 4,839,007. The dopant provides the coating with good electrical conductivity. Only thin sub- and top coatings are required.

The following Examples illustrate the present invention.

EXAMPLE 1

The electrolyzer used was as depicted and described in reference to FIGS. 2 and 3. The anode 60, and anode sections of the bipolar anodes 70, 72, 74, and 76, were a titanium plate coated with tantalum oxide and iridium oxide, using an aqueous, acidic solution of chloride salts, the coating being applied in the manner as disclosed in Example 1 of U.S. Pat. No. 4,797,182. The disclosure of this patent is incorporated by reference herein.

When a test was conducted, simply with a set of these anodes, such was a "control" test.

For preparing a tin dioxide top coated anode, there was first blended into 250 milliliters of normal butanol, 11 grams concentrated hydrochloric acid, 3.7 grams antimony trichloride, and 34.6 grams of tin tetrachloride. A set of coated anodes (the control test) were cleaned by vapor degreasing. The tin dioxide coating solution was applied by a roll coating technique as a top coat, and after each application, the coating was dried and then baked in air at 500° C. for ten minutes. Eight coats in all were applied in this manner. Following the final coat, the substrate was baked at 500° C. for one hour. The topcoat to undercoat weight ratio, on a metals basis of tin to tantalum-iridium, was 3:8.

When a test was conducted with a set of these anodes, such was the "invention" test.

The electrolyzer test unit employed was located on a drilling rig platform located in the Gulf of Mexico. The human waste generated at the platform was macerated, and was mixed with seawater to produce a reaction mixture. The reaction mixture was introduced into the electrolyzer of FIGS. 2 and 3. During the control and invention tests, samples were taken from holding tank 28 after about thirty minutes holding time. Measurements were conducted on the samples for residual chlorine discharged, i.e., for the chlorine content in the effluent that would be discharged from the holding tank 28, as well as for BOD5 (five day biochemical oxygen demand) and for total suspended solids (T.S.S.) (all results being reported in milligrams per liter of electrolyzer effluent).

To conduct the control and invention tests, the electrolyzer was run for seven days with a set of anodes as the control test. Thereafter, the anodes in the electrolyzer were replaced with the anodes containing the tin dioxide coating (the invention anodes), and the electrolyzer was run for seven days as an invention test.

During the week of the control test, an average of 16.5 people were on board the platform.

During the week of the invention test, an average of 15.2 people were on board the platform.

The results of these tests, as determined by the chlorine, BOD5 and T.S.S. analyses, are reported in Table 1 below.

TABLE 1

| Test | BOD5 | T.S.S. | Chlorine |
| --- | --- | --- | --- |
| Control | 37.1 | 98.3 | 39.3 |
| Invention | 18.7 | 41.2 | 21.2 |

The results for all data are the averages of 29 samples. According to the statistical t test, from the data collected, there is a 90% chance that the chlorine was reduced 46%, a 99% chance that the BOD5 was reduced 50% and a 99% chance that T.S.S. was reduced 58%. Moreover, measurements were conducted on the samples for a coliform count and the average reading was 7.6 for the control test, but was only 0.1 for the invention test, thus showing the highly desirable disinfection of the discharge achieved during the invention test.

The tin dioxide coated anodes were thus seen to dramatically improve the performance operation of an existing electrolysis cell, in a marine wastewater treatment facility. Although not wanting to be bound by any theory, it is believed that the reduction in total suspended solids is being achieved by enhanced solids conversion to $CO_2$ and $H_2O$.

EXAMPLE 2

The electrolyzer used, and the anodes used, were as described in Example 1. The electrolyzer test unit employed was located on a drilling rig platform located off the coast of Alaska, and was the human waste electrolyzer provided for the platform. The electrolyzer used seawater for waste treatment. By using seawater, hypochlorite was produced in the electrolyzer. During the test, electrolyzer effluent samples were taken and measurements were conducted for BOD5 and for total suspended solids (T.S.S.).

As in Example 1, the electrolyzer was run with a set of the control test anodes. The time for this control test was six months. Thereafter, the anodes in the unit were replaced with the invention test anodes, as described in Example 1, containing the tin dioxide coating, and the unit was run for slightly over three months, as an invention test. The results of the test, as demonstrated by the BOD5 and T.S.S. analyses, in milligrams/liter (mg/l) of electrolyzer effluent, are reported in Table 2. The Alaska Department of Environmental Conservation, for sampling once per month, requires a maximum for BOD5 and T.S.S. each at 60 mg/l. The results reported are averages for both the control and invention tests, but excluding two anomalous data sets, occurring one each for the control test and the invention test, when an electrolyzer vent line plugged, as well as excluding one anomalous data set, measured at the commencement of the invention test.

TABLE 2

| Test | BOD5* | T.S.S. |
|---|---|---|
| Control | 84.8 | 55.2 |
| Invention | 32.3 | 26.9 |

*Five day biochemical oxygen demand

As can be seen from the above tabulated results, the tin dioxide coating anode provided for over a 60% reduction in BOD5. This was accompanied by over a 50% reduction in total suspended solids. The tin dioxide coated anodes were thus seen to consistently greatly reduce total suspended solids in the effluent from an existing electrolysis cell located in a marine facility for purifying water containing human waste. As shown by Examples 1 and 2, the present invention is applicable to diverse environments.

From the above description of the invention, those skilled in the art will perceive improvements, changes and modifications. Such improvements, changes and modifications within the skill of the art are intended to be covered by the appended claims.

Having described the invention, the following is claimed:

1. A method for the on-site treatment at a marine location of domestic waste, said waste containing suspended solids in liquid media, comprising the steps of:
   (a) macerating said domestic waste on site for reducing the particle size of solids in such liquid media;
   (b) mixing a salt-containing substance on site with said domestic waste forming a reaction mixture;
   (c) introducing at said marine location said reaction mixture into an electrolyzer, said electrolyzer comprising:
      (i) a reaction chamber containing said reaction mixture;
      (ii) an anode in said reaction chamber;
      (iii) a cathode in said reaction chamber;
      (iv) means for passing a direct current between said anode and said cathode;
      (v) said anode comprising an electro-chemically active coating top coated with a tin dioxide surface coating, said electrolyzer generating oxygenated species and hypochlorite; and
   (d) passing treated reaction mixture on site from said electrolyzer to a holding tank, such sequence compared to the same treatment using a control cell having an anode with an electrochemically reactive coating of tantalum oxide and iridium oxide, achieving a reduction in BOD of at least about 30%, and a reduction in total suspended solids of at least about 30%.

2. The method of claim 1 wherein said anode comprises a tin dioxide coating on an electroconductive coated substrate.

3. The method of claim 1 wherein said anode comprises a tin dioxide coating on an active coating of a platinum group metal, or an oxide selected from the group consisting of platinum group metal oxides, magnetite, ferrite and cobalt oxide spinel, or a mixed material of at least one oxide of a valve metal and at least one oxide of a platinum group metal, which active coating is in turn on a valve metal anode substrate.

4. The method of claim 3 wherein said tin dioxide coating is doped with one or more of antimony oxide, F, Cl, Sb, Mo, W, Nb, or Ta.

5. The method of claim 1 wherein said domestic waste contains both black water and gray water.

6. The method of claim 1 wherein said domestic waste is mixed with brine or seawater as a salt-containing substance.

7. The method of claim 6 wherein said sequence achieves a reduction in residual chlorine discharged of at least about 40%.

8. The method of claim 1 wherein said sequence achieves a reduction in BOD of at least about 40% and a reduction in total suspended solids of at least about 40%.

9. The method of claim 1 wherein said sequence achieves a reduction in BOD of at least about 50% and a reduction in total suspended solids of at least about 50%.

* * * * *